United States Patent
Ueno et al.

(10) Patent No.: US 9,274,233 B2
(45) Date of Patent: Mar. 1, 2016

(54) DOSAGE RATE MEASUREMENT SYSTEM AND DOSAGE RATE MEASUREMENT METHOD

(71) Applicant: HITACHI, LTD., Tokyo (JP)

(72) Inventors: Katsunori Ueno, Tokyo (JP); Hiroshi Kitaguchi, Tokyo (JP); Takahiro Tadokoro, Tokyo (JP); Akihisa Kaihara, Tokyo (JP); Koichi Okada, Tokyo (JP); Yoshinobu Sakakibara, Tokyo (JP); Yuta Inamura, Tokyo (JP); Hitoshi Kuwabara, Tokyo (JP)

(73) Assignee: Hitachi, Ltd., Toyko (JP)

( * ) Notice: Subject to any disclaimer, the term of this patent is extended or adjusted under 35 U.S.C. 154(b) by 0 days.

(21) Appl. No.: 14/367,942

(22) PCT Filed: Dec. 3, 2012

(86) PCT No.: PCT/JP2012/081264
§ 371 (c)(1),
(2) Date: Jun. 23, 2014

(87) PCT Pub. No.: WO2013/099528
PCT Pub. Date: Jul. 4, 2013

(65) Prior Publication Data
US 2015/0123002 A1    May 7, 2015

(30) Foreign Application Priority Data
Dec. 27, 2011   (JP) ................. 2011-284699

(51) Int. Cl.
   *G01T 1/20*   (2006.01)
   *G01T 1/10*   (2006.01)
   *G01T 1/105*  (2006.01)

(52) U.S. Cl.
CPC .. *G01T 1/10* (2013.01); *G01T 1/105* (2013.01)

(58) Field of Classification Search
CPC ............ G01T 1/10; G01T 1/11; G01T 1/105; G01T 1/023
USPC ......................................... 250/362
See application file for complete search history.

(56) References Cited

U.S. PATENT DOCUMENTS 6,087,666 A * 7/2000 Huston et al. .............. 250/484.5
6,479,829 B1   11/2002 Katagiri
(Continued)

FOREIGN PATENT DOCUMENTS

JP   61-226677 A   10/1986
JP   09-159527 A    6/1997
(Continued)

OTHER PUBLICATIONS

International Search Report issued in International Application No. PCT/JP2012/081264, mailed Feb. 26, 2013.
(Continued)

*Primary Examiner* — David J Makiya
*Assistant Examiner* — Taeho Jo
(74) *Attorney, Agent, or Firm* — Mattingly & Malur, PC

(57) ABSTRACT

Provided is a measurement unit and measurement method for reducing attenuation due to optical fiber length and SN degradation due to background in a dosage rate monitor that uses optical fiber. This system comprises: a radiation detector for detecting radiation dosage; a light source for irradiating stimulating light on the radiation detector; a photodetector for detecting light generated by the radiation detector; an optical fiber for connecting the photodetector and the radiation detector and light source, and transmitting light from the light source and light from the radiation detector; a measurement unit for counting the pulses outputted from the photodetector; and an analysis unit for extracting the luminous energy originating from the radiation detector, from time information, wave height information, and the count value, which are measurement results obtained by the measurement unit, and converting the luminous energy to a dosage and dosage rate.

13 Claims, 6 Drawing Sheets

(56) References Cited

U.S. PATENT DOCUMENTS

| | | | |
|---|---|---|---|
| 8,563,947 B2* | 10/2013 | Kearfott | 250/484.2 |
| 2002/0117614 A1 | 8/2002 | More et al. | |
| 2003/0057380 A1 | 3/2003 | Katagiri | |
| 2004/0135098 A1 | 7/2004 | Katagiri | |
| 2004/0238757 A1* | 12/2004 | Gaza et al. | 250/484.5 |
| 2004/0262538 A1* | 12/2004 | Polf et al. | 250/484.5 |
| 2009/0001286 A1* | 1/2009 | Kearfott | 250/484.2 |
| 2013/0248721 A1* | 9/2013 | Williams | 250/362 |

FOREIGN PATENT DOCUMENTS

| | | | |
|---|---|---|---|
| JP | 10-90414 A | | 4/1998 |
| JP | H1090414 | * | 4/1998 |
| JP | 11-237479 A | | 8/1999 |
| JP | 2000-249796 A | | 9/2000 |
| JP | 2001-208850 A | | 8/2001 |
| JP | 2001-511528 A | | 8/2001 |
| JP | 2001-318150 A | | 11/2001 |
| JP | 2004-191134 A | | 7/2004 |
| SU | 1668960 A1 | | 8/1991 |
| WO | 99/05544 A1 | | 2/1999 |
| WO | 2006130486 A2 | | 12/2006 |
| WO | WO 2012036570 A1 | * | 3/2012 |

OTHER PUBLICATIONS

Japanese Office Action received in corresponding Japanese Application No. 2011-284699 dated Apr. 28, 2015.
Extended European Search Report received in corresponding European Application No. 12861293.4 dated Jul. 23, 2015.

* cited by examiner

RELATIONSHIP BETWEEN MEASURED VALUE AND DOSAGE

OSL LIGHT & LIGHT SOURCE WAVELENGTH DISTRIBUTION

RADIATION DETECTOR UNIT WITH CONDENSING LENS

DOSAGE RATE MEASUREMENT SYSTEM AND DOSAGE RATE MEASUREMENT METHOD

TECHNICAL FIELD

The present invention relates to a dosage rate measurement system and a dosage rate measurement method, and in particular, to dosage rate measurement systems and dosage rate measurement methods for suitably measuring a dosage and a dosage rate in a radiation detector by counting pulses radiated from the radiation detector and analyzing a light quantity on the basis of time and pulse height information in the radiation detector.

BACKGROUND ART

As a radiation detector for measuring a dosage based on radiation, a detector such as an ionization chamber, a GM (Geiger-Muller) counter tube, a scintillation detector or a semiconductor detector is widely used as a dosage monitor such as an area monitor, a process monitor or a survey meter. A radiophotoluminescence glass dosimeter, a thermoluminescence dosimeter, or an optically stimulated luminescent dosimeter is used as an individual radiation exposure management or imaging plate. These dosage monitor, individual dosimeter and imaging plate are used mainly in atomic energy facilities, medical facilities using radioactive isotope, or research accelerator facilities.

In a conventional method using a dosage monitor, it is general that an application voltage of several volts to thousands of volts is supplied to the aforementioned detector to operate the detector an electrical signal associated with radiation is sent from the detector via a coaxial cable or the like to a measurement device provided at a downstream stage to analyze the signal. As an example, the detector applied to the dosage monitor used in atomic energy facilities is one of a silicon semiconductor detector, an NaI (TI) scintillation detector and an ionization chamber, any of which requires electricity supply thereto.

In the aforementioned various facilities, dosage monitoring based on these detectors can be achieved without any troubles in a usual operating situation. However, when power supply cannot be achieved due to a power failure or the like, it becomes difficult to measure a dosage.

As a radiation measurement means which eliminates the need of power supply to the detector, a dosage monitor using optical fiber is suggested. The arrangement is that scintillation element is connected at a tip end of an optical fiber, light applied to the element is converted to an electrical signal by an optical detector provided at a downstream stage of the fiber for analysis thereof. As a position measurement means, an optical detector is provided at each of both ends of an optical fiber and a detection position is derived by using a time difference between light detections of the detectors.

However, even in any of the above systems, the amount of scintillation light is very small and it is difficult to prolong an optical fiber length from the viewpoint of SN ratio. Accordingly, such a system cannot be applied to such atomic energy facilities as to require long wiring of the cables. In order to achieve dosage monitoring using optical fiber in such facilities, a measurement system and a measurement method for reducing attenuation due to optical fiber length and SN degradation due to background are required.

Typical fluorescent materials for converting a dosage to a light quantity include NaI (TI), BGO, and GSO, and light irradiated immediately after occurrence of an interaction with radiation is used to analyze a dosage, a radiation energy and so on. An optically stimulated luminescent (OSL) element, utilizing a proportional relationship between the formation amount of a color center and an accumulated dosage, analyzes an accumulated dosage from OSL light irradiated when optically stimulated light from a light source is transited from an excited state to a base state.

PATENT LITERATURE 1 is characterized in that an OSL element is connected at a tip end of an optical fiber, stimulated light is irradiated from a laser light source thereto to thereby generate scintillation light originated from the OSL, and the light is measured by an optical detector provided at a stage downstream thereof.

PATENT LITERATURE 2 is characterized in that a device for analyzing the fluorescent dosage of a fluorescent material contained in a sample includes a means for increasing a multiplication factor of an optical detector only in a time range where the fluorescent dosage of a fluorescent material is dominant on the basis of a pulse light generation timing signal of a light source.

CITATION LIST

Patent Literatures

PATENT LITERATURE 1: JP-A-11-237479
PATENT LITERATURE 2: JP-A-9-159527

SUMMARY OF INVENTION

Technical Problem

In facilities requiring long wiring of a cable, in order to attain a dosage monitor using optical fiber, a measurement system and a measurement method for reducing attenuation due to optical fiber length and SN degradation due to background becomes necessary.

In PATENT LITERATURE 1, attenuation of OSL light and laser light is suppressed by connecting two optical fibers to an OSL element (with use of a twin fiber system). However, there is no description of a device arrangement and its algorithm for reducing SN degradation in the measurement system and arithmetic device and so on therein.

In PATENT LITERATURE 2, an SN ratio is improved by providing a means for increasing a multiplication factor of an optical detector only in a time range where the fluorescent dosage of a fluorescent material is dominant. However, use of the technique of PATENT LITERATURE 2 has a restriction, because a very long time is provided to a laser to which light from a fluorescent material is directed and such a means can be applied only when the fluorescent light is sufficiently sustained even after the fluorescent light directed to the laser is stopped. For example, in order to carry out dosage measurement using OSL light, it becomes necessary to generate OSL light by irradiation of a laser or the like and to extinguish it. However, the irradiation time of the OSL light is sufficiently short with respect to the laser irradiation time. Thus application of the means of PATENT LITERATURE 2 becomes difficult.

When attenuation due to optical fiber length and SN degradation due to background can be reduced, the dosage monitor can be made accurate and measurement can be made with an accuracy equivalent to that of various conventional monitors requiring electricity supply thereto. An object of the present invention is to solve the above problem by providing a dosage rate measurement system and a dosage rate measurement method for reducing attenuation due to optical fiber length and SN degradation due to background.

Solution to Problem

A dosage rate measurement system of the invention of claim 1 for attain the above object is characterized in that the system includes a radiation detector, a light source for irradiating stimulated light on the radiation detector via an optical fiber, an optical detector for detecting light generated in the radiation detector and transmitted via the optical fiber, a measurement unit connected to the radiation detector, the light source and the optical detector for counting pulses outputted from the optical detector and also for obtaining attendant information, and an analysis unit for extracting a dosage originating from the radiation detector and converting the dosage and a dosage rate on the basis of time information, pulse height information and the counted value as measurement results obtained in the measurement unit.

A dosage rate measurement system of the invention of claim 2 is characterized by including a wavelength analysis unit provided in an optical detector part.

A dosage rate measurement system of the invention of claim 3 is characterized in that the system measures a detected time and a detected pulse peak value for each of pulses inputted to the measurement unit.

A dosage rate measurement system of the invention of claim 4 is characterized in that the system includes an analysis unit for analyzing a measures result as a net value with use of time information, pulse height information and a counted value in the background.

A dosage rate measurement system of the invention of claim 5 is characterized in that the system includes an OSL element provided in a radiation detector.

A dosage rate measurement system of the invention of claim 6 is characterized in that a dosage rate is derived from the irradiation interval of a light source and a measured result of an analysis unit.

A dosage rate measurement system of the invention of claim 7 is characterized in that the system includes a condensing lens for collecting OSL light at a radiation detector and inputting the light to an optical fiber.

A dosage rate measurement system of the invention of claim 8 is characterized in that the system includes an optical fiber for the light source and a detecting optical fiber for connecting the radiation detector and the optical detector.

A dosage rate measurement system of the invention of claim 9 is characterized in that an optical coupler is provided between the light source, the optical detector and the radiation detector and a single optical fiber is provided between the optical coupler and the radiation detector.

A dosage rate measurement system of the invention of claim 10 is characterized in that an optical switch is provided between the light source, the optical detector and a plurality of radiation detectors, the plurality of radiation detectors are connected via the optical switch to the single optical detector and to the light source, and dosages and dosage rates in the plurality of radiation detectors are measured by a single measurement unit and by a single analysis unit.

A dosage rate measurement system of the invention of claim 11 is characterized in that an analysis result is displayed in the form of a three-dimensional distribution from analysis results obtained from time information, pulse height information and a counted value as measured results obtained in the measurement unit.

A dosage rate measurement system of the invention of claim 12 is characterized in that an analysis method in the analysis unit is carried out by specifying a time range and a pulse height range and by analyzing a dosage and a dosage rate.

A dosage rate measurement method of the invention of claim 13 is characterized in that stimulated light is irradiated on a radiation detector via an optical fiber, light generated in the radiation detector and transmitted via the optical fiber is detected, pulses outputted from the detected light are counted as a counted value, a light amount originating from the radiation detector is extracted on the basis of time information, pulse height information and the counted values as measured results obtained by the pulse counting, and is converted to a dosage and a dosage rate Advantageous Effects of Invention In accordance with the inventions of claims 1 and 13, the dosage monitor can be used with a high accuracy.

In a more concrete example, when a counted pulse result is analyzed on a time basis; an environmental background stationarily present without any correlation to stimulated light irradiation, a light source background generated by stimulated light irradiation and stationarily present, and OSL light generated by the stimulated light irradiation and attenuated in a manner of exponential function can be discriminated and analyzed on a time basis. Further, highly frequent areas of the environmental background and light source background can be discriminated by analyzing in an area where a counted value for the OSL light is superior to a counted value due to the background as pulse height value. As a result, even when it is required in various facilities to route or wire an optical fiber in a wide range, power supply to a detector can be eliminated, and thus a dosage and a dosage rate can be measured with a high accuracy and sensitivity.

In accordance with the invention of claim 2, when a measuring range is specified to the wavelength area of OSL light, the background due to light source wavelength can be effectively reduced, and thus a dosage and a dosage rate can be measured with a high accuracy and sensitivity.

In accordance with the invention of claim 3, when time pulse height information for each pulse are used, a time analysis and pulse height analysis ranges in the analysis unit can be arbitrarily changed, and thus a dosage and a dosage rate can be analyzed with an optimum accuracy in various measurement environments.

In accordance with the invention of claim 4, a net value is measured by subtracting an environmental background present at the time of measuring an OSL light output and a background due to light source scatted light from measured data on the basis of time, pulse height and counted value then a dosage and a dosage rate can be measured with a high accuracy and sensitivity.

In accordance with the invention of claim 5, when an OSL element is used as a radiation detector, a radiation amount can be accumulated; and when scintillation light is irradiated based on the stimulated light of the light source, a dosage and a dosage rate can be measured at an arbitrary time. Further, when the OSL element is arranged so as to sufficiently accumulate the dosage, a high SN ratio can be measured.

In accordance with the invention of claim 6, the irradiation interval of the light source becomes a dosage accumulation time of the radiation detector. Thus when the irradiation interval time and a measured dosage are used, dosage rate can be measured.

In accordance with the invention of claim 7, when the OSL element is provided with a lens for collecting light at a tip end of an optical fiber, OSL light irradiated in a $4\pi$ direction can be efficiently collected and a dosage and a dosage rate can be measured with a high SN ratio.

In accordance with the invention of claim 8, when an optical fiber is connected between the light source and the radiation detector and between the radiation detector and the optical detector respectively, attenuation on an optical path can be minimized and a dosage and a dosage rate can be attained with a high SN ratio.

In accordance with the invention of claim 9, when an optical coupler is provided, optical fiber wiring to the radiation detectors can be attained with a single optical fiber, and thus the system of the invention ca be easily installed in various facilities.

In accordance with the invention of claim 10, when an optical switch is provided, the radiation detectors can be easily used in a multichannel form, and dosages and dosage rates at the plural parts can be measured with use of a single measurement unit and a single analysis unit.

In accordance with the invention of claim 11, when the acquired time information, pulse height information and counted value are set for any of X, Y and Z axes as a three-dimensional distribution and measured results are displayed; the range of high OSL light output level or the range of the background can be easily confirmed. Thus, a time and a pulse height range with a high SN ratio can be specified and a dosage and a dosage rate can be analyzed with an optimum accuracy.

In accordance with the invention of claim 12, when a time range and a pulse height range are specified, a range where the background id dominant can be eliminated and thus, a dosage and a dosage rate can be measured with a high SN ratio. Other objects, features and advantages of the present invention will become clear from the following description of embodiments of the invention by referring to the attached drawings.

DESCRIPTION OF EMBODIMENTS

Figure 1:
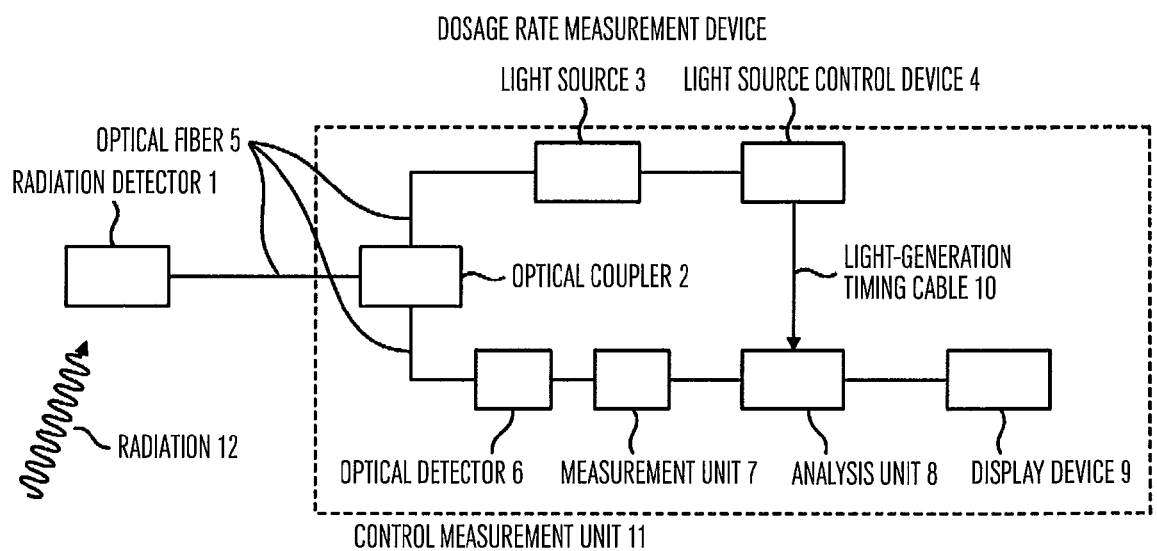
FIG. 1 shows an arrangement of a dosage rate measurement unit in an embodiment 1 of the present invention.

The inventors of the present invention have, in various manners, examined and found a measurement unit and a measurement method for reducing attenuation due to optical fiber length and SN degradation due to background in a dosage monitor using optical fiber on the basis of novel consideration.

In this consideration, when a counted pulse value result of an optical detector output is analyzed on a time basis, an environmental background stationarily present without any correlation to stimulated light irradiation, a light source background generated by stimulated light irradiation and stationarily present during the irradiation, and OSL light generated by the stimulated light irradiation and attenuated in a manner of exponential function can be discriminated and analyzed. Further, highly frequent areas of the environmental background and light source background can be discriminated by analyzing in an area where a counted value for the OSL light is superior to a counted value due to the background as pulse height value. Thus, even when it is required in various facilities to install an optical fiber in a wide range, the need of power supply to a detector can be eliminated and therefore a dosage and a dosage rate can be measured with a high accuracy and a high sensitivity.

Suitable embodiments of a dosage rate measurement system and a measurement method thereof in accordance with the present invention, that is, the contents of the novel consideration will be explained in detail with reference to the attached drawings.

Embodiment 1

A dosage rate measurement system and a measurement method thereof in an embodiment 1 as one of suitable embodiments of the present invention will be explained by using FIGS. 1 to 5. The dosage rate measurement system of the embodiment 1 includes a radiation detector 1, an optical coupler 2, a light source 3, a light source control device 4, an optical fiber 5, an optical detector 6, a measurement unit 7, an analysis unit 8, and a display device 9. A control measurement unit 11 includes the optical coupler 2, the light source 3, the light source control device 4, the optical fiber 5, the optical detector 6, the measurement unit 7, the analysis unit 8, and the display device 9. The radiation detector 1 is connected via the optical fiber 5 to the optical coupler 2. The optical coupler 2 is connected to the light source 3 and to the optical detector 6 via two of the optical fibers 5. The light source 3 is connected to the light source control device 4. The optical detector 6 is connected to the measurement unit 7. A light-generation timing cable 10, connected to the measurement unit 7 and the light source control device 4, is connected to the analysis unit 8. The analysis unit 8 is connected to the display device 9.

The radiation detector 1 has a function of detecting a radiation 12.

Figure 2:
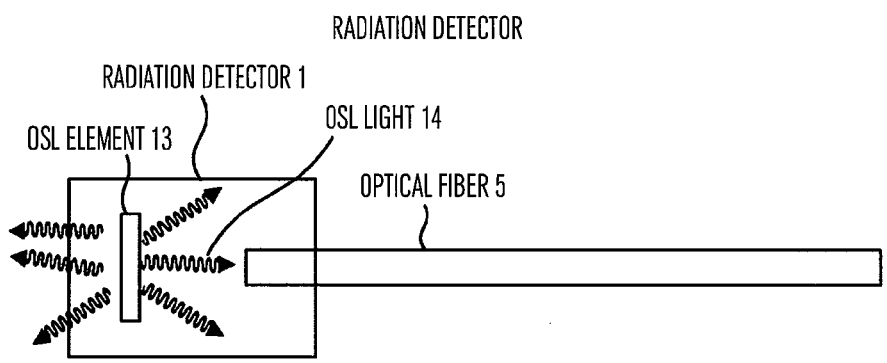
FIG. 2 shows an arrangement of a radiation detector in the embodiment 1.

FIG. 2 shows a structure of the radiation detector 1. An optically stimulated luminescent (OSL) element 13 for accumulating a radiation amount is installed within the radiation detector 1. Examples of such OSL elements will be enumerated here. Typical ones of such OSL elements are BaFBr:Eu for use in an imaging plate and Al2O3:C for use as an individual dosimeter. Other OSL elements include BaFl:Eu, NaCl:Cu, KCl:Eu, KBr:Eu, RbBr:Tl, SrS:Eu, Sm, CsS:Eu, Sm, CaS:Ce,sm, MgS:Eu,Sm, MgS:Ce,Sm, MgO:Fe, Zn2SiO4:Mn, Ba6(PO4)3O:Eu, 25Na2O and 75B2O3:Eu. When stimulated light generated from the light source 3 is irradiated on the OSL element, OSL light 14 is generated from the OSL element. When the OSL light 14 is directed into a tip end of the optical fiber 5, the OSL light is transmitted via the optical coupler 2 to the optical detector 6.

As the light source 3, a light source for generating light having a range of such wavelengths as to generate the OSL light 14 is used. The light emission of the light source 3 is controlled with use of the light source control device 4. Light for stimulating the OSL light may be light of a continuous or pulse type. The light source control device 4 has a function of externally issuing its output at timing equivalent to light generation, and the output is transmitted via the light-generation timing cable 10 to the analysis unit 8.

The optical detector 6 detects the OSL light 14 transmitted via the optical coupler 2, a light source background originating from the light source 3, and an environmental background. Typical examples of such optical detectors 6 include a photomultiplier tube and a semiconductor detector.

Figure 3:
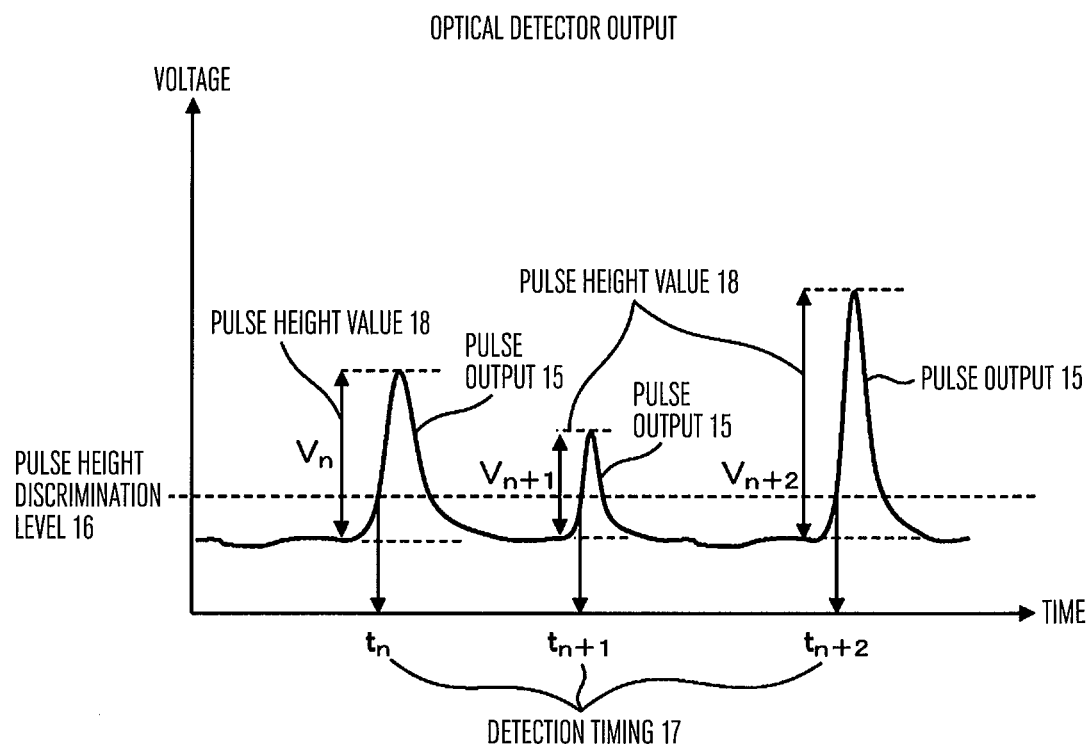
FIG. 3 shows an example of an output of an optical detector in the embodiment 1.

The measurement unit 7 has a function of measuring a time of output of the optical detector and a pulse height thereof. FIG. 3 shows an example of the output of the optical detector. When light is inputted to the optical detector 6, a pulse output 15 as the output of the optical detector is outputted from the optical detector 6 and measured by the measurement unit 7. A pulse height value 18 of the pulse output 15 is a voltage level with respect to a base line as a reference, and the pulse height value 18 is measured for each pulse. As an example of a method of acquiring a detection timing of the pulse output 15, a timing exceeding a pulse height discrimination level 16 can be set at a detection timing 17. There are other methods which include a method of setting a peak of the pulse output 15 as a detection timing and a method of setting zero-cross point obtained by a constant fluction timing system as a detection timing. The detection timing 17 acquired by any of the methods is measured for each pulse by the measurement unit 7.

Figure 4:
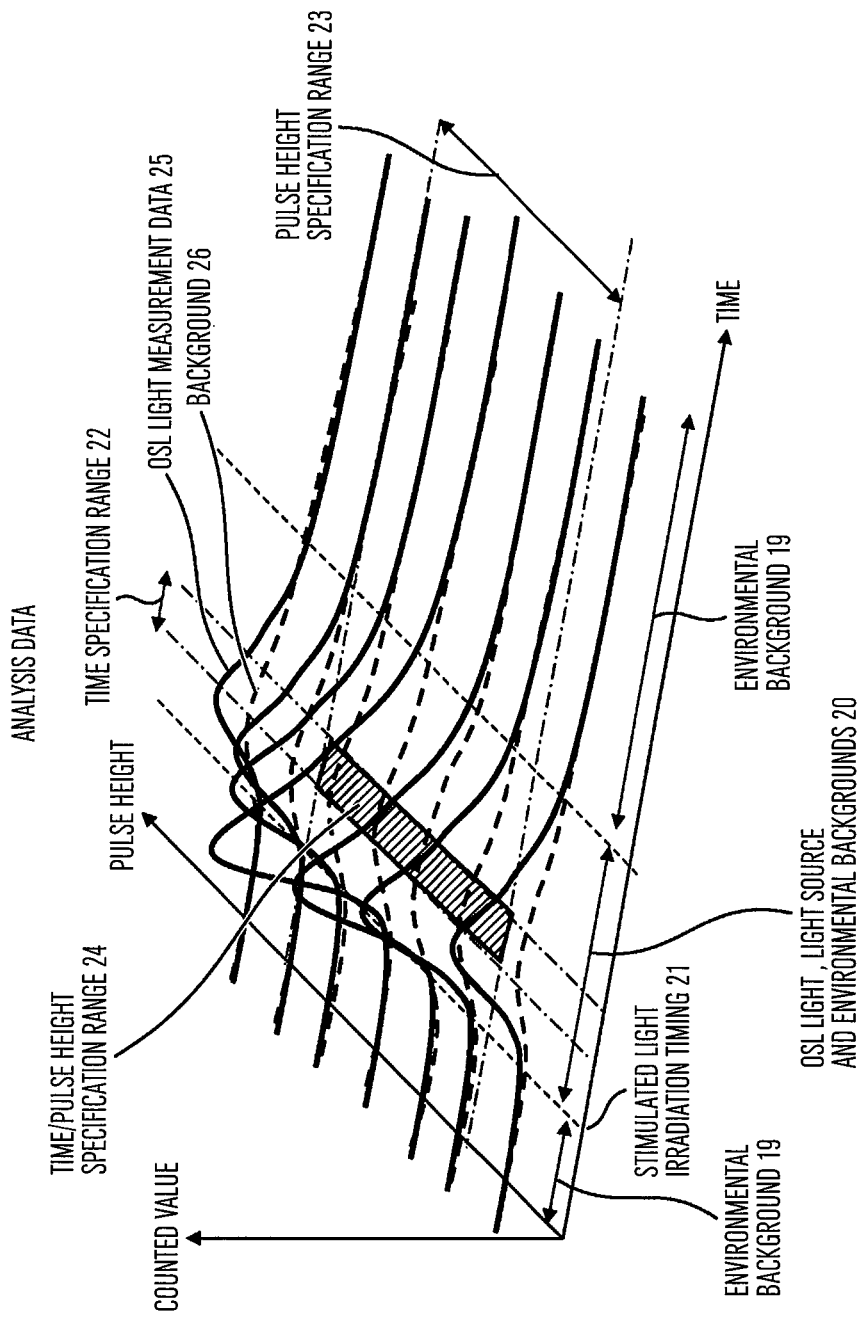
FIG. 4 shows an example of analysis data based on time pulse height and counted value in the embodiment 1.

The analysis unit 8 is used to extract a signal component based on the OSL light 14 from time and pulse height information for each pulse measured by the measurement unit 7. FIG. 4 is an example of analysis data analyzed by the analysis unit 8. In this drawing, OSL light measurement data 25 is denoted by a solid line, and a background 26 is denoted by a dotted line. A stimulated light irradiation timing 21 is determined on the basis of an output transmitted from the light-generation timing cable 10.

With respect to the OSL light measurement data 25, measurement data measured prior to the stimulated light irradiation timing 21 in a time axis is data based on an environmental background 19. Measurement data measured later than the stimulated light irradiation timing 21 is data including data based on the OSL light, light source and an environmental background 20. Data measured after the light output based on the OSL light 14 is sufficiently reduced and after generation of stimulated light from the light source 3 is stopped at an arbitrary time is data based on the environmental background 19. Even in a pulse height axis, a change in the pulse height distribution later than the stimulated light irradiation timing 21 is observed.

The background 26 indicates measurement data in such an environment as to have no signal component based on the OSL light 14. The background based on the light source 3 is measured later than the stimulated light irradiation timing 21. When compared with the OSL light measurement data 25, a change in the output of the background data appears later than the stimulated light irradiation timing 21.

In order to analyze a light quantity of the OSL light 14 with use of the OSL light measurement data 25, a time specification range 22 and a pulse height specification range 23 are selected, and a counted value in a time/pulse height specification range 24 satisfying both of the first-mentioned specification ranges is used as a measurement value.

When the influence of the background 26 to the OSL light measurement data 25 is great and this influences a measurement accuracy, it is also possible to subtract the background 26 therefrom and derive the measurement value as a net value.

Figure 5:
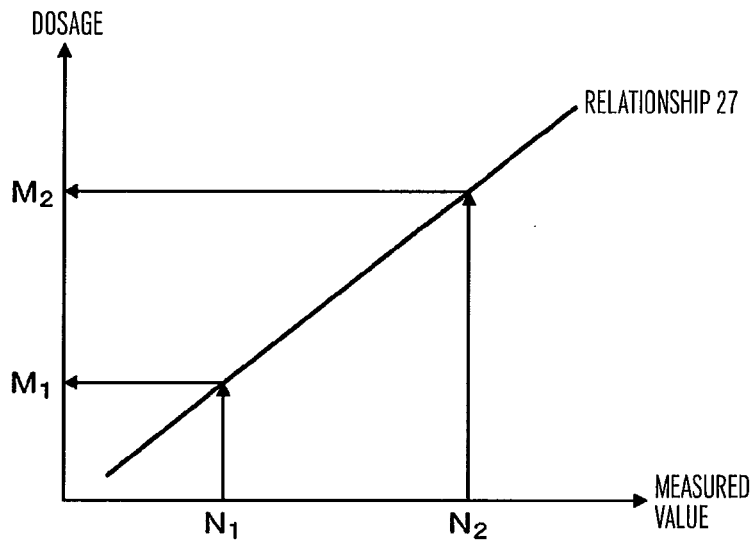
FIG. 5 shows a relationship between a measured value and a dosage in the embodiment 1.

FIG. 5 shows a relationship between a measurement value and a dosage. The measurement value acquired from the OSL light measurement data 25 is derived as a dosage from a relationship 27 prepared before measurement. Since a light quantity based on the OSL element and an accumulated dosage have a substantially proportional relationship, the relationship 27 between the measurement value and dosage is set as a first-order or second-order function. The dosage derived in FIG. 5 can be converted to a dosage rate with use of an accumulation time. As the accumulation time, for example, an irradiation interval time of the stimulated light irradiation timing 21 is used.

When the radiation detector 1, optical coupler 2, light source 3, light source control device 4, optical fiber 5, optical detector 6, measurement unit 7, analysis unit 8 and display device 9 included in the above embodiment are used, a dosage rate measurement system and a measurement method thereof can be attained, attenuation due to optical fiber length and SN degradation due to background can be reduced, the need of power supply to the detector can be eliminated, and a dosage and a dosage rate can be measured with a high accuracy and a high sensitivity.

Embodiment 2

Explanation will be made as to a dosage rate measurement system and a measurement method thereof as an embodiment 2 as another embodiment of the present invention. In the embodiment 2, an SN ratio can be effectively increased by adding a wavelength analysis unit.

Figure 6:
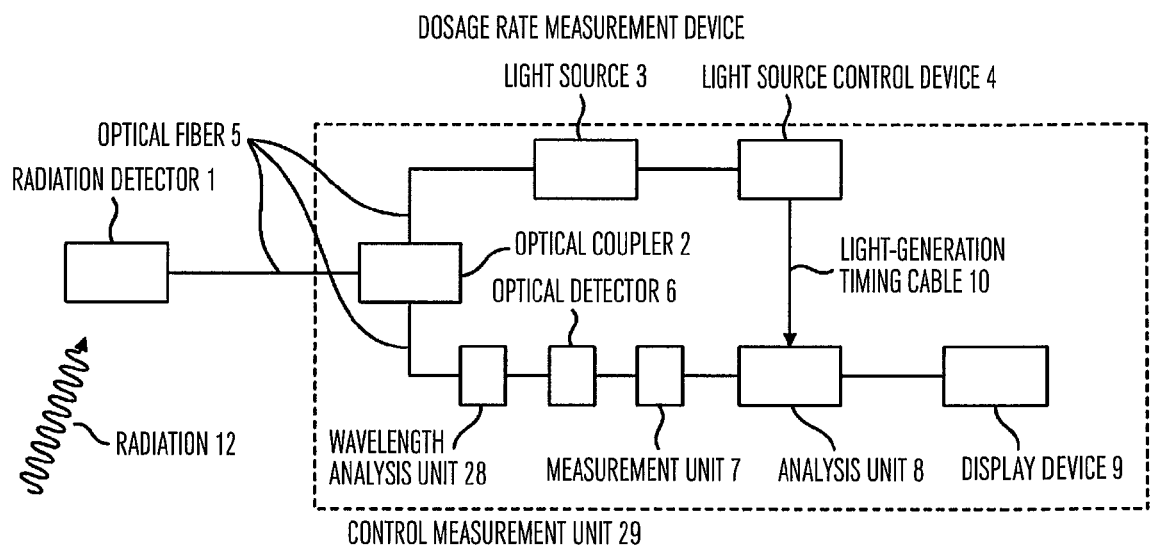
FIG. 6 shows an arrangement of a dosage rate measurement unit in an embodiment 2.

FIG. 6 shows a dosage rate measurement unit. The arrangement of this embodiment is substantially the same as the arrangement of the embodiment 1, except that the wavelength analysis unit 28 is connected to the optical coupler 2 via the optical fiber 5 and also connected to the optical detector 6 provided at a downstream stage.

Figure 7:
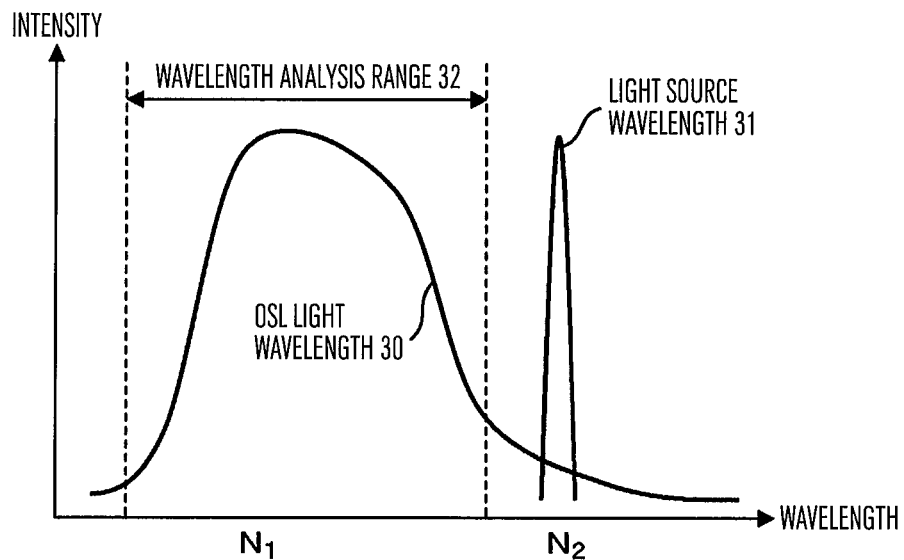
FIG. 7 shows distributions of OSL light and light source wavelength and also shows a wavelength analysis range in the embodiment 2.

FIG. 7 shows OSL light and a light source wavelength distribution. The wavelength analysis unit 28 measures an OSL light wavelength 30 and a light source wavelength 31. When a wavelength analysis range 32 where the OSL light wavelength 30 and the light source wavelength 31 can be effectively discriminated is specified and when the optical detector 6, measurement unit 7 and analysis unit 8 provided at a downstream stage perform measuring operation only in the specified range; measurement with a high SN ratio can be attained. Accordingly, when the present embodiment is applied, a dosage and a dosage rate can be measured with a high accuracy and a high sensitivity.

Embodiment 3

Explanation will be made as to a dosage rate measurement system and a measurement method thereof as an embodiment 3 as another embodiment of the present invention. In the embodiment 3, an SN ratio can be effectively increased by adding a condensing lens to the radiation detector.

Figure 8:
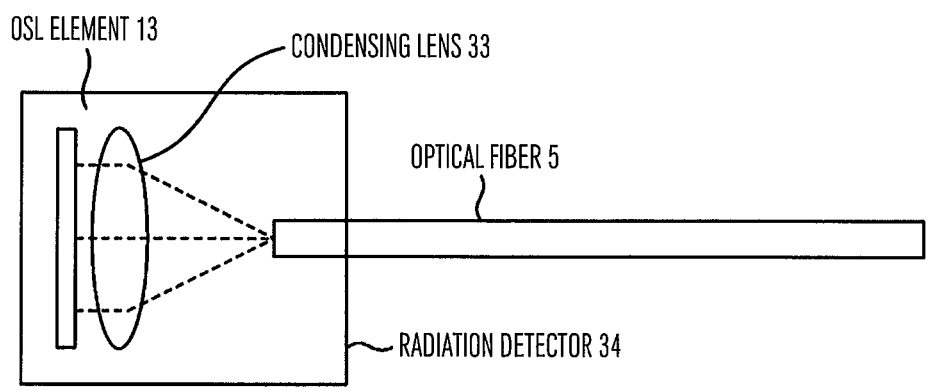
FIG. 8 shows an arrangement of a radiation detector having a condensing lens in an embodiment 3.

FIG. 8 shows a radiation detector provided with a condensing lens. A condensing lens 33 is provided between the optical fiber 5 and the OSL element 13. It is assumed that the focus point of the condensing lens 33 is set at the wavelength of the OSL light and the position of the focus point is set at a tip end of the optical fiber 5. The condensing lens 33, the OSL element 13 and the tip end of the optical fiber 5 are located within a radiation detector 34. The control measurement unit 11 provided at a stage downstream of the optical fiber 5 is substantially the same as that in the embodiment 1. When the present embodiment is applied, since OSL light can be effectively collected into the optical fiber by condensing, a dosage and a dosage rate can be measured with a high SN ratio.

Embodiment 4

Explanation will be made as to a dosage rate measurement system and a measurement method thereof as an embodiment 4 as another embodiment of the present invention. In the embodiment 4, an optical fiber is connected between a light source and a radiation detector and between a radiation detector and an optical detector respectively, attenuation on an optical path can be minimized.

Figure 9:
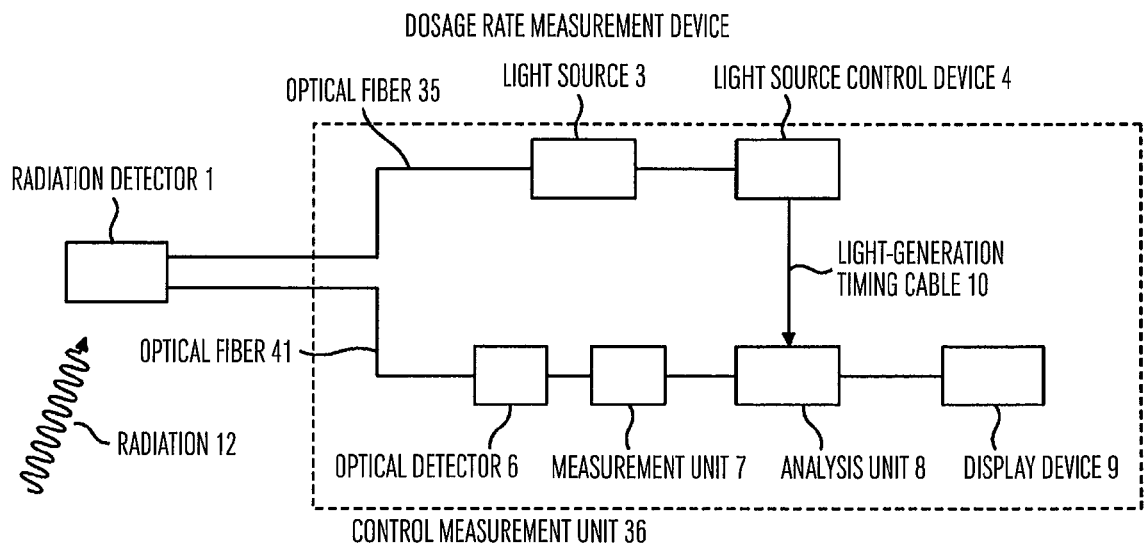
FIG. 9 shows an arrangement of a dosage rate measurement unit in an embodiment 4.

FIG. 9 shows a dosage rate measurement unit. This embodiment has a substantially the same arrangement as the embodiment 1, except that two of an optical fiber 35 and an optical fiber 41 are connected between the light source 3 and the radiation detector 1 and between the optical detector 6 and the radiation detector 1 respectively. The optical fiber 35 connected between the light source 3 and the radiation detector 1 is provided to irradiate stimulated light generated from the light source 3 on the OSL element 13 provided in the radiation detector 1. The optical fiber 41 connected between the optical detector 6 and the radiation detector 1 is provided to transmit the OSL light 14 to the optical detector 6. Since the optical fiber 41 does not transmit directly stimulated light generated from the light source 3, the light source background level can be reduced. Further, since the optical fiber 41 is connected directly to the radiation detector 1 and to the optical detector 6 to eliminate the arrangement of attenuating a light quantity of the optical coupler 2 and so on, a signal component based on the OSL light 14 can be efficiently detected. Accordingly, when the present embodiment is applied, a dosage and a dosage rate can be measured with a high SN ratio.

Embodiment 5

Explanation will be made as to a dosage rate measurement system and a measurement method thereof in accordance with an embodiment 5 as another embodiment of the present invention. In the embodiment 5, since an optical switch is provided, the radiation detector can be easily made in the form of a multichannel.

Figure 10:
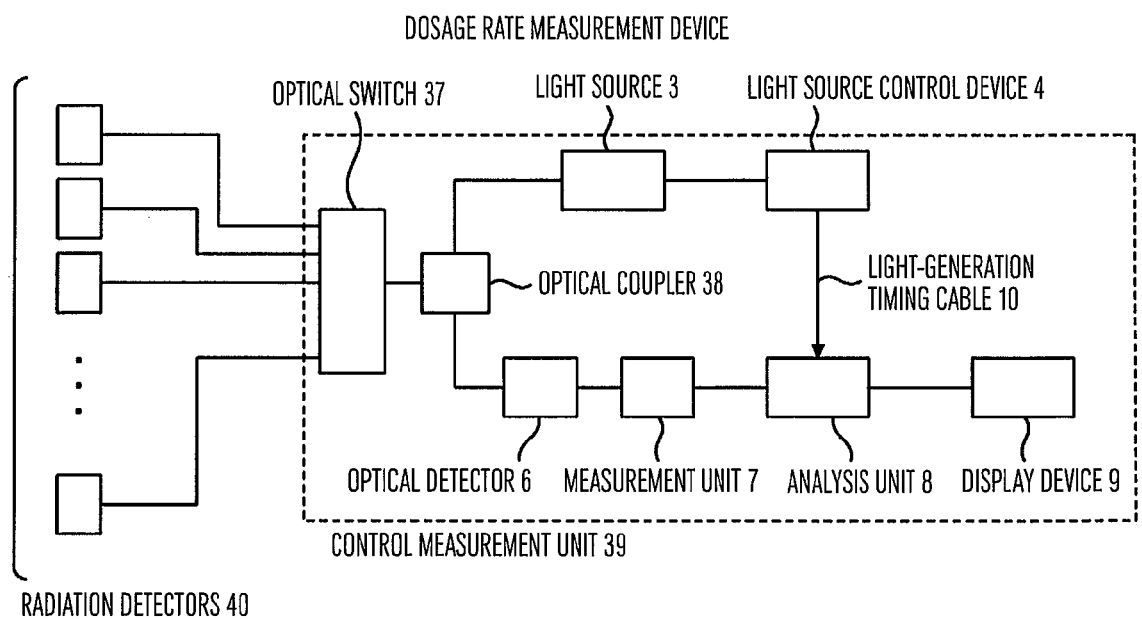
FIG. 10 shows an arrangement of a dosage rate measurement unit in an embodiment 5.

FIG. 10 shows a dosage rate measurement unit. This embodiment has a substantially the same arrangement as the arrangement of the embodiment 1, except that an optical switch 37 is provided in a control measurement unit 39 and radiation detectors 40 corresponding in number to the number of multiple channels of the optical switch 37 are provided. The optical switch 37 is connected to the optical coupler 2 and also to the plurality of radiation detectors 40. The optical switch 37 can select arbitrary one of the connected radiation detectors 40, and units or devices connected downstream of the optical detector 6 can allow measurement of a dosage and a dosage rate in each of the radiation detectors 40. When the present embodiment is applied, the plurality of radiation detectors 40 can easily perform its measuring operation with a low cost with use of the single light source 3, light source control device 4, optical detector 6, measurement unit 7, analysis unit 8 and display device 9.

Embodiment 6

A dosage rate measurement system and a measurement method thereof in accordance with an embodiment 6 as another embodiment of the present invention, when the aforementioned embodiments 1 to 5 are suitably combined, can measure a dosage and a dosage rate with a high accuracy and a high sensitivity even in various facilities requiring a wide range of laying of optical fibers. The above description has been made in connection with the embodiments. However, it will be clear to those skilled in the art that the present invention is not limited to the embodiments, but may be changed or modified in various ways within the scope of the attached claims.

REFERENCE SIGNS LIST 1, 34, 40 radiation detectors
2, 38 optical couplers
3 light source
4 light source control device
5, 35 optical fibers
6: optical detector
7: measurement unit
8: analysis unit
9: display device
10 light-generation timing cable
11, 29, 36, 39 control measurement units
12 radiation
13 OSL element
14 OSL light
15 pulse output
16 pulse height discrimination level
17 detection timing
18 pulse height value
19 environmental background
20 OSL light, light source and environmental backgrounds
21 stimulated light irradiation timing
22 time specification range
23 pulse height specification range
24 time/pulse height specification range
25 OSL light measurement data
26 background
27 relationship
28 wavelength analysis unit
30 OSL light wavelength
31 light source wavelength
32 wavelength analysis range
33 condensing lens
37 optical switch

The invention claimed is:

1. A dosage rate measurement system comprising:
   a radiation detector;
   a light source for irradiating stimulated light on the radiation detector via a first optical fiber;
   an optical detector for detecting light transmitted via a second optical fiber and generated in the radiation detector;
   a measurement unit for measuring pulses outputted from the optical detector including a time of output of pulses from the optical detector and a pulse height thereof; and
   an analysis unit for extracting, from a counted value on time corresponding to light through a same optical path, a counted value corresponding to a light quantity originating from the radiation detector in a time/pulse height specification range satisfying both a time specification range, and a pulse height specification range, on the basis of the time of output of pulses and the pulse height measured in the measurement unit, and for converting the counted value to a dosage and a dosage rate.

2. A dosage rate measurement system according to claim 1, wherein a wavelength analysis unit is provided in the optical detector.

3. A dosage rate measurement system according to claim 1, wherein a time and pulse height value detected for each the pulses inputted to the measurement unit are measured.

4. A dosage rate measurement system according to claim 1, wherein the analysis unit analyzes a measured result as a net value with use of time information, pulse height information and a counted value for a background.

5. A dosage rate measurement system according to claim 1, wherein an optically stimulated luminescence (OSL) element is provided in the radiation detector.

6. A dosage rate measurement system according to claim 1, wherein the dosage rate is derived from a stimulated light irradiation interval from the light source and measurement results of the analysis unit.

7. A dosage rate measurement system according to claim 1, wherein a condensing lens for collecting the OSL light to the radiation detector and inputting it into the second optical fiber is provided in the radiation detector.

8. A dosage rate measurement system according to claim 1, wherein the first optical fiber is a light source optical fiber for connecting the light source and the radiation detector and the second optical fiber is a detecting optical fiber for connecting the radiation detector and the optical detector.

9. A dosage rate measurement system according to claim 1, wherein an optical coupler is provided among the light source, the optical detector and the radiation detector, and a single optical fiber is provided between the optical coupler and the radiation detector.

10. A dosage rate measurement system according to claim 1, wherein an optical switch is provided between the optical detector and the radiation detector, a plurality of such radiation detectors and the single optical detector and light source are connected via the optical switch, and a dosage and a dosage rate in the plurality of such radiation detectors are measured by the single measurement unit and analysis unit.

11. A dosage rate measurement system according to claim 1, wherein an analysis result is displayed in the form of a three-dimensional distribution on the basis of the time information, the pulse height information and the counted value obtained in the measurement unit.

12. A dosage rate measurement system according to claim 1, wherein, as an analysis method in the analysis unit, a time range and a pulse height range are specified, and a dosage and a dosage rate are analyzed.

13. A dosage rate measurement method comprising the steps of:
- irradiating stimulated light on a radiation detector via an optical fiber;
- detecting light transmitted via the optical fiber and generated in the radiation detector;
- measuring pulses outputted from the detected light, including measuring a time of output of pulses from the optical detector and a pulse height thereof;
- extracting a light quantity originating from the radiation detector in a time/pulse height specification range satisfying both a time specification range, and a pulse height specification range on the basis of the time of output of pulses and the pulse height measured in the measuring step; and
- converting the extracted data to a dosage and a dosage rate.

* * * * *